US 9,489,538 B2

United States Patent
Vyas et al.

(10) Patent No.: US 9,489,538 B2
(45) Date of Patent: Nov. 8, 2016

(54) ROLE-BASED ANONYMIZATION

(71) Applicant: Alcatel-Lucent, Paris (FR)

(72) Inventors: Avinash Vyas, East Brunswick, NJ (US); Benwen Zhu, Ottawa (CA); Florent Bornard, Villeneuve Tolosane (FR)

(73) Assignee: Alcatel Lucent, Boulogne-Billancourt (FR)

( * ) Notice: Subject to any disclaimer, the term of this patent is extended or adjusted under 35 U.S.C. 154(b) by 42 days.

(21) Appl. No.: 14/146,190

(22) Filed: Jan. 2, 2014

(65) Prior Publication Data
US 2015/0186674 A1    Jul. 2, 2015

(51) Int. Cl.
G06F 17/30 (2006.01)
G06F 21/00 (2013.01)
G06F 21/60 (2013.01)
G06F 21/62 (2013.01)
H04L 29/06 (2006.01)

(52) U.S. Cl.
CPC ....... *G06F 21/6254* (2013.01); *H04L 63/0421* (2013.01)

(58) Field of Classification Search
CPC ........ G06F 17/30; G06F 21/00; G06F 21/60; G06F 21/62; H04L 63/0414; H04L 2209/42
USPC .................................................... 726/26–28
See application file for complete search history.

(56) References Cited

U.S. PATENT DOCUMENTS

| 2006/0123461 | A1 | 6/2006 | Lunt et al. |
| 2009/0254572 | A1* | 10/2009 | Redlich et al. ................. 707/10 |
| 2011/0113050 | A1* | 5/2011 | Youn ................... G06F 21/6218 707/757 |
| 2012/0259877 | A1* | 10/2012 | Raghunathan et al. ...... 707/757 |
| 2014/0047551 | A1* | 2/2014 | Nagasundaram et al. ...... 726/26 |
| 2014/0310679 | A1* | 10/2014 | Bhattacharya ........ G06F 11/362 717/102 |
| 2014/0317756 | A1* | 10/2014 | Takahashi ....................... 726/26 |

OTHER PUBLICATIONS

PCT/IB2014/003186. Applicant: Alcatel Lucent. Int'l Search Report & Written Opinion (Aug. 24, 2015).
Samarti et al., "Protecting privacy when disclosing information: k-anonymity and its enforcement through generalization and suppression." SRI Int'l Tech. Report, XX, XX (Jan. 1, 1998).
Sweeney, "Computational disclosure control for medical microdata: The Datafly System." (Dec. 31, 1997).

* cited by examiner

*Primary Examiner* — Joseph P Hirl
*Assistant Examiner* — Kalish Bell
(74) *Attorney, Agent, or Firm* — Loza & Loza, LLP (57) ABSTRACT

A data anonymization system provides role-based anonymization for data requesters. The system applies a base anonymization function to subscriber data related to at least one subscriber of a service provider to produce base anonymized subscriber data. Upon receiving a request for the subscriber data from a data requester, a role assigned to that data requester is determined to identify a custom anonymization function to be applied to the subscriber data in order to produce custom anonymized subscriber data for the data requester.

20 Claims, 5 Drawing Sheets

| ROLE TABLE ||||
|---|---|---|---|
| BASE ANONYMIZATION ROLE | BAF ID | PARAMETERS ||
| DRR1 | DR1 ID | CAF1 ID | PARAMETERS |
| DRR2 | DR2 ID | CAF2 ID | PARAMETERS |
| DRR3 | DR3 ID | CAF3 ID | PARAMETERS |
| ⋮ | ⋮ | | |
| DRRN | DRN ID | CAFN ID | PARAMETERS |

FIG. 5 ained in the prior art or what is not in the prior art.
ROLE-BASED ANONYMIZATION

CROSS-REFERENCE TO RELATED PATENTS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND

1. Technical field

This invention relates generally to data anonymization systems and in particular, but not exclusively, to systems for managing anonymized subscriber data.

2. Description of related art

This section introduces aspects that may be helpful to facilitating a better understanding of the invention. Accordingly, the statements of this section are to be read in this light and are not to be understood as admissions about what is in the prior art or what is not in the prior art.

Service providers are increasingly concerned about complying with the legal requirements for ensuring the privacy of their subscriber's data. One of the key legal requirements is to anonymize the subscriber data before using it for a purpose (e.g., marketing or analytics) other than providing the service requested by the subscriber.

There are several research prototypes for data anonymization, but very few commercial systems, as data anonymization is still a very active research area. Commercial systems primarily use data masking (e.g., replacing whole or parts of a sensitive value with a random string), while the research prototypes typically use either some variant of k-anonymity (e.g., hiding the actual secret in a set of k possible secrets) or differential privacy (e.g., ensuring that the output of a function does not change significantly due to the presence or absence of an individual's data).

There exists a fundamental tradeoff between privacy and the utility of the subscriber data resulting from the reduction in the quality of the data due to anonymization. Therefore, service providers may need to take into account the data quality requirements when anonymizing the data. This becomes even more challenging as different applications/usages of data have different data quality requirements. Thus, service providers have a need for an anonymizing framework that provides multiple options to meet the privacy requirements as well as data utility requirements of different usages.

However, neither commercial nor research prototype data anonymization systems provide more than one way of anonymizing data. These systems are designed and implemented primarily to address one specific datum in the spectrum of privacy utility tradeoff. In addition, these systems do not take into account the identity or role of the accessing party to adjust the degree of anonymity and/or utility of the data. In addition, some systems use irreversible one-way data transformation functions, such as generalization (e.g., replacing a precise value with a semantically consistent but less precise value). Therefore, it is not possible to obtain the original data or improve the quality of the data, if required by an application (e.g., for usage by a government authority or for system diagnosis).

SUMMARY

Embodiments of the present disclosure are directed to data anonymization systems that provide role-based anonymization for data requesters. An apparatus of the data anonymization system includes an interface for receiving subscriber data related to at least one subscriber of a service provider. The interface further receives a request for the subscriber data from a data requester and provides custom anonymized subscriber data to the data requester. The apparatus further includes a processor for determining a role assigned to the data requester, the role specifying a custom anonymization function to be applied to the subscriber data. The processor is further configured to apply a base anonymization function to the subscriber data to produce base anonymized subscriber data and to apply the custom anonymization function to the base anonymized subscriber data to produce the custom anonymized subscriber data. The apparatus still further includes a memory for storing the base anonymized subscriber data and a privacy policy specifying the base anonymization function and the role.

In another embodiment, a non-transitory memory device of the data anonymization system has accessible therefrom a set of instructions interpretable by at least one processor. The set of instructions is configured for causing the processor to carry out operations for applying a base anonymization function to subscriber data related to at least one subscriber of a service provider to produce base anonymized subscriber data and for determining a role assigned to a data requester requesting the subscriber data, in which the role specifies a custom anonymization function to be applied to the subscriber data. The set of instructions is further configured for causing the processor to carry out operations for applying the custom anonymization function to the base anonymized subscriber data to produce custom anonymized subscriber data and for providing the custom anonymized subscriber data to the data requester.

In still another embodiment, a method for managing anonymized data includes applying a base anonymization function to subscriber data related to at least one subscriber of a service provider to produce base anonymized subscriber data and determining a role assigned to a data requester requesting the subscriber data, in which the role specifies a custom anonymization function to be applied to the subscriber data. The method further includes applying the custom anonymization function to the base anonymized subscriber data to produce custom anonymized subscriber data and providing the custom anonymized subscriber data to the data requester.

In some embodiments of any of the above apparatus/methods, the base anonymization function and the custom anonymization function are a same type of anonymization, the base anonymization function provides a base level of anonymization of the subscriber data and the custom anonymization function provides an additional level of anonymization of the subscriber data over the base level.

In some embodiments of any of the above apparatus/methods, the custom anonymization function is a different type of anonymization than the base anonymization function.

In some embodiments of any of the above apparatus/methods, the custom anonymization function is a de-anonymization function that de-anonymizes the base anonymized subscriber data to produce de-anonymized subscriber data as the custom anonymized subscriber data. In an example embodiment, the de-anonymized subscriber data is the original subscriber data.

In some embodiments of any of the above apparatus/methods, the custom anonymization function specifies that the base anonymized subscriber data is the custom anonymized subscriber data.

In some embodiments of any of the above apparatus/methods, at least one of the base anonymization function and the custom anonymization function is a composite anonymization function including two or more types of data anonymization.

In some embodiments of any of the above apparatus/methods, the base anonymization function and the custom anonymization function each include one or more of an encryption function, a decryption function, a k-anonymity function and a data masking function.

In some embodiments of any of the above apparatus/methods, the role includes a type of anonymity and one or more parameters for the type of anonymity for the custom anonymization function.

In some embodiments of any of the above apparatus/methods, the data requester is authenticated prior to receiving the custom anonymized subscriber data. In an example embodiment, the data requester is authenticated using a token provided by the data requester with the request for the subscriber data.

DETAILED DESCRIPTION

Figure 1:
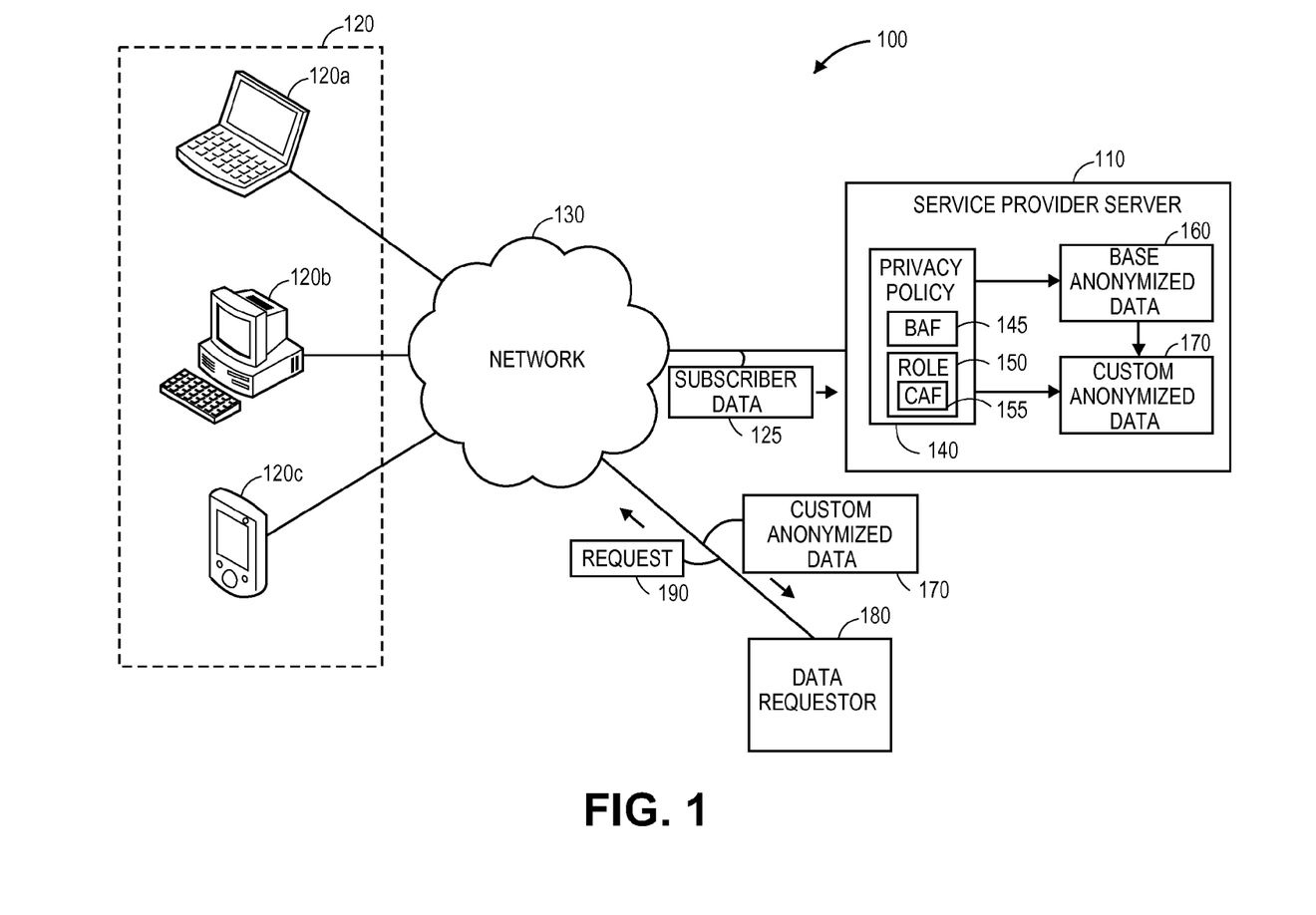
FIG. 1 illustrates a schematic diagram of an embodiment of a data anonymization system for providing role-based anonymization.

FIG. 1 illustrates an embodiment of a data anonymization system 100 for providing role-based anonymization. The data anonymization system 100 includes a service provider server 110 and a plurality of subscriber devices 120. The subscriber devices 120 may be, for example, laptop devices 120a, desktop devices 120b (e.g., a desktop computer coupled to a monitor), mobile devices 120c (e.g., a smartphone, tablet or other mobile device) or other type of subscriber device. The subscriber device 120 is coupled to the service provider server 110 via a network 130. The network 130 may include, for example, one or more of a wired network (e.g., an Internet Protocol (IP) network, local area network or other type of wired network) and a wireless network (e.g., WiFi, WLAN, 3G, 4G or other type of wireless network).

Each of the subscriber devices 120 is configured to provide subscriber data 125 related to the subscriber associated with the subscriber device 120 and/or the operation of the subscriber device 120 by the subscriber to the service provider server 110 either directly (e.g., by phone or in person) or via the network 130 (e.g., by entering the data into an online form or during usage of the subscriber device 120). Examples of subscriber data 125 include, but are not limited to, the name, address, phone number, age and gender of the subscriber, the web browsing history of the subscriber device, calls made and/or received by the subscriber device, the applications downloaded and used on the subscriber device, the videos watched on the subscriber device and the location of the subscriber device (or location history for mobile devices).

The service provider server 110 is associated with and maintained by a service provider. The service provider server 110 collects the subscriber data 125 associated with a plurality of subscriber devices 120 that purchase and/or use one or more products and/or services provided by the service provider. By way of example, but not limitation, the service provider may be, a wireless telephone company, a web browsing company, a web service company, an Internet service provider company or other company providing products and/or services to customers/subscribers.

In one embodiment, the service provider uses the collected subscriber data 125 to provide the requested product and/or service. In another embodiment, the service provider uses the collected subscriber data 125 for purposes other than providing the requested product and/or service. For example, the service provider may use the collected subscriber data 125 for internal marketing, customer care or analytical purposes or may sell or otherwise provide the subscriber data 125 to one or more third parties.

In embodiments in which the service provider uses the collected subscriber data 125 for a purpose other than providing the requested product and/or service, the service provider may be required to meet the legal privacy requirements imposed on the service provider with respect to the subscriber data 125. For example, most countries have privacy laws that require the service provider to anonymize the subscriber data 125 to the extent that the resulting anonymized subscriber data cannot be associated with any particular customer/subscriber.

However, the degree of required anonymity varies between countries (and may vary between regions/states within countries). In addition, within a particular region/country, the degree of required anonymity may vary between usages of the anonymized subscriber data. For example, if the anonymized subscriber data is used internally for marketing, diagnostic or other purposes, one level of anonymity may be required, whereas if the anonymized subscriber data is offered for sale to third parties, a higher level of anonymity may be required. As another example, if the anonymized subscriber data is requested by a government authority, a lower level of anonymity (or no anonymity) may be required. Thus, the level of anonymity may depend on the intended recipient of the anonymized subscriber data (referred to herein as the "data requester" 180). Moreover, different types or levels of anonymity may be desired by different data requesters 180, on top of the legal privacy requirements for that data requester.

To provide for different levels and/or types of anonymity for different data requesters 180, while still meeting the legal anonymization requirements for the subscriber data 125, the service provider server 110 maintains a privacy policy 140 that takes into account the respective role 150 of each data requester 180 for use in adjusting the degree of privacy and utility of the subscriber data 125 for that data requester 180. In particular, the privacy policy 140 specifies a base anonymization function (BAF) 145 that meets the minimum legal privacy requirements for the jurisdiction of the service provider, and for each role 150 (each data requester 180), a custom anonymization function (CAF) 155 that indicates any further anonymization or de-anonymization to be performed to achieve the degree of privacy and data utility required by that data requester 180.

In an example embodiment, the service provider server 110 applies the BAF 145 to the subscriber data 125 to produce base anonymized data 160 for storage of the base anonymized data 160 therein. Upon receiving a request 190 for anonymized subscriber data from a particular data requester 180, the service provider server 110 accesses the privacy policy 140 to identify the role 150 of the data requester 180. Based on the role 150, the service provider server 110 applies the CAF 155 associated with the role 150 to the base anonymized data 160 to produce custom anonymized data 170, and provides the custom anonymized data 170 to the data requester 180. As used herein, the term "custom" indicates that a particular action, item or characteristic includes at least one attribute that may be selected at least in part based on the identity of the requester.

In one embodiment, the CAF 155 specifies one or more additional anonymization functions to be applied to the base anonymized data 160 to comply with stricter privacy requirements. In another embodiment, the CAF 155 specifies a de-anonymization function to de-anonymize the base anonymized data 160 to produce de-anonymized data as the custom anonymized data 170. For example, the de-anonymized data may be the original subscriber data 125 or partially de-anonymized data that has an improved quality with respect to the base anonymized data 160. As used herein, the term "quality" refers to at least the readability of the subscriber data, but may also include other attributes of the subscriber data. In still another embodiment, the CAF 155 specifies that no additional anonymization or de-anonymization should be applied to the base anonymized data 160. In this embodiment, the base anonymized data 160 is provided to the data requester 180 as the custom anonymized data 170.

The BAF 145 and CAF 155 may each include a single type of anonymization or a composite of two or more types of anonymization and/or de-anonymization. Anonymization types may include, for example, encryption, k-anonymity, data masking, generalization or other type of anonymization. For each type of anonymization, the BAF 145 and CAF 155 further specify a level of anonymization. For example, in an embodiment in which the BAF 145 and CAF 155 are each generalization anonymization functions and the subscriber data 125 includes location data indicating particular coordinates at which a subscriber device 120 is located, the BAF 145 may generalize the location data to a particular subdivision or city block and the CAF 155 may then further generalize the location data to a particular city.

The service provider server 110 may further be integrated with or coupled to (via a local or wide area network) one or more network devices, including, for example, a web server, a database, a wired or wireless switch and other network devices involved in collecting, anonymizing and/or providing anonymized subscriber data. For example, the service provider server 110 may store the base anonymized data 160 in a database coupled to the service provider server 110. As another example, the service provider server 110 may be coupled to a web server of the service provider to receive the subscriber data 125 and/or receive the request 190 and provide the custom anonymized data 170. As still another example, the service provider server 110 may be coupled via a local area network of the service provider to the data requester 180, which may be, for example, an application running on a device within the local area network.

Figure 2:
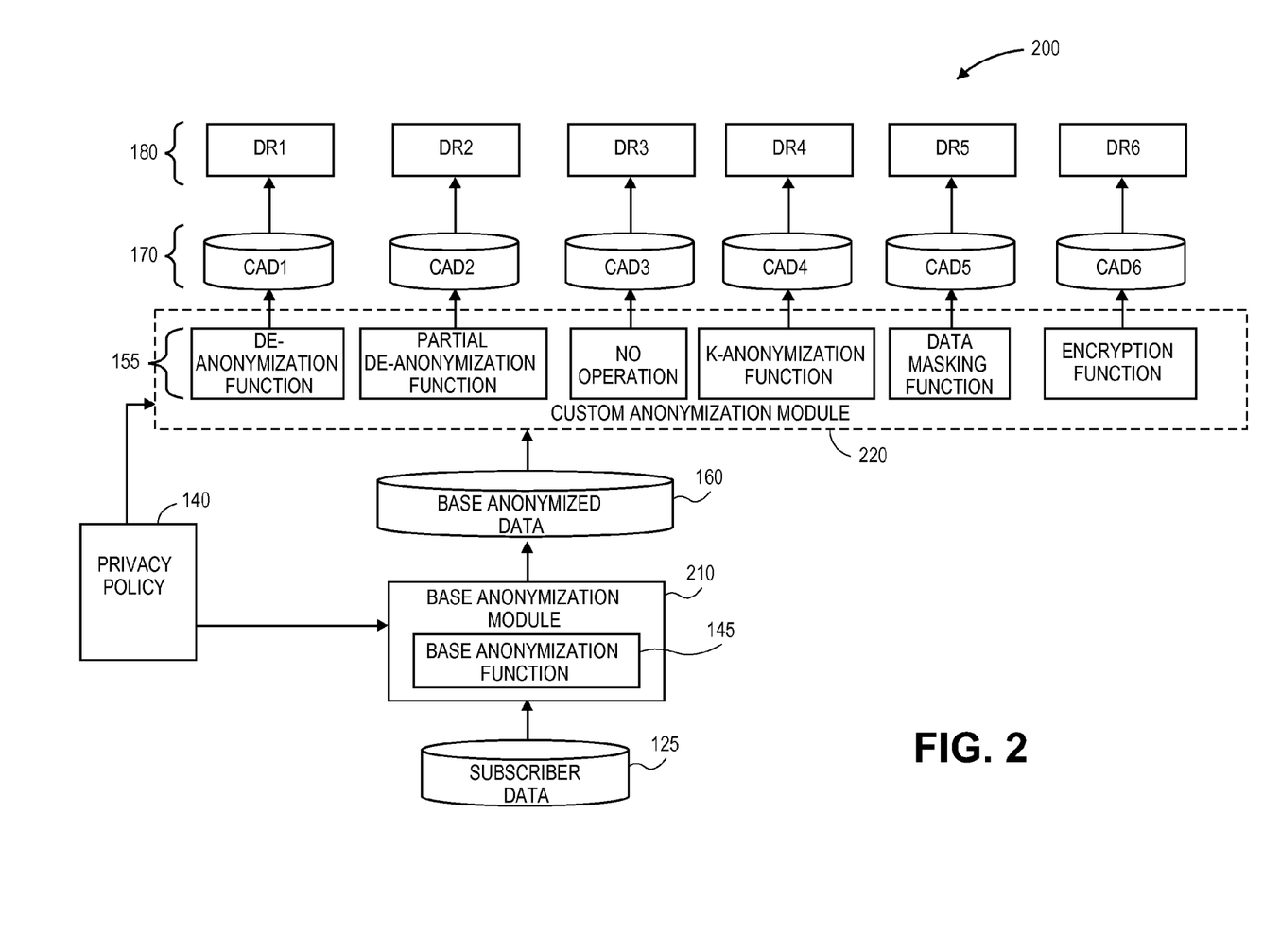
FIG. 2 illustrates a schematic diagram of an embodiment of a role-based anonymization system.

FIG. 2 illustrates a schematic diagram of an embodiment of a role-based anonymization system 200 that may be implemented, for example, by the service provider server 110 of FIG. 1. As shown in FIG. 2, original (raw) subscriber data 125 is input to a base anonymization module 210. The base anonymization module 210 accesses the privacy policy 140 to determine the base anonymization function (BAF) 145 for the system and applies the base anonymization function (BAF) 145 to the original subscriber data 125 to produce base anonymized data 160. The base anonymized data 160 is maintained by the system 200 and updated as new original subscriber data 125 is input to the base anonymization module 210.

The base anonymized data 160 is then input to a custom anonymization module 220. For each data requester 180, the custom anonymization module 220 accesses the privacy policy 140 to determine the role assigned to the data requester 180 and the corresponding custom anonymization function (CAF) 155 to be applied to the base anonymized data 160 for the data requester 180. For example, as shown in FIG. 2, the privacy policy 140 can specify that a de-anonymization function is to be applied to the base anonymized data 160 for a first data requester (DR1) (i.e., a government agency) to produce the original subscriber data 125 as the first custom anonymized data (CAD1) provided to DR1, while a partial de-anonymization function is to be applied to the base anonymized data 160 for a second data requester (DR2) (i.e., a customer care center or diagnostic application of the service provider) to produce partially de-anonymized data as the second custom anonymized data (CAD2) provided to DR2. The privacy policy 140 can further specify that no operation is to be applied to the base anonymized data 160 for a third data requester (DR3) (i.e., an analytical application of the service provider) to produce the base anonymized data 160 as the third custom anonymized data (CAD3) provided to DR3.

The privacy policy 140 can then further specify that a k-anonymization function is to be applied to the base anonymized data 160 for a fourth data requester (DR4) (i.e., a marketing department of the service provider) to produce k-anonymized data as the fourth custom anonymized data (CAD4) provided to DR4, while a data masking function is to be applied to the base anonymized data 160 for a fifth data requester (DR5) (i.e., an auditor of the service provider) to produce data masked anonymized data as the fifth custom anonymized data (CAD5) provided to DR5. In addition, the privacy policy 140 can also specify that an encryption function is to be applied to the base anonymized data 160 for a sixth data requester (DR6) (i.e., a third party) to produce encrypted anonymized data as the sixth custom anonymized data (CAD6) provided to DR6.

Figure 3:
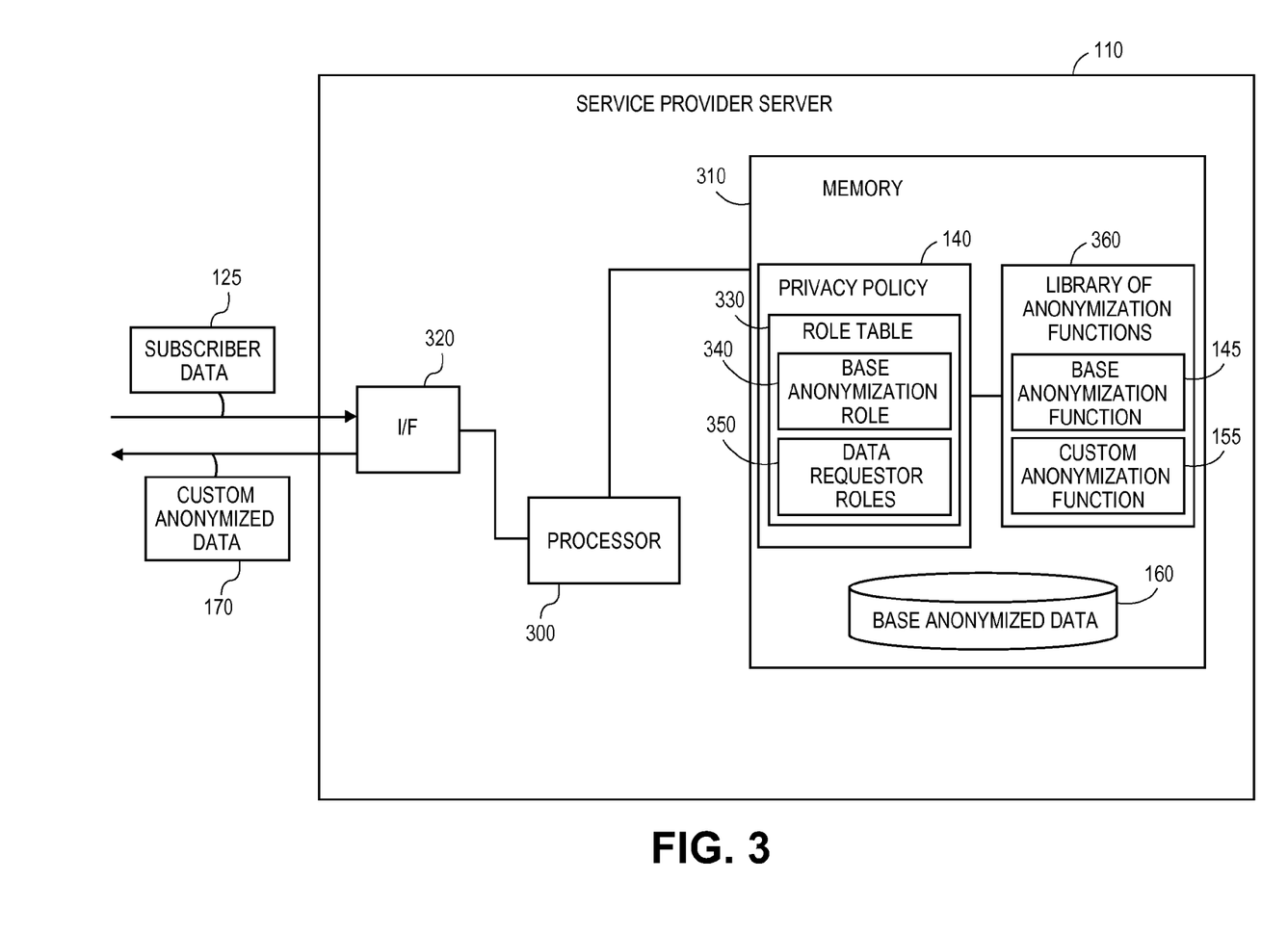
FIG. 3 illustrates a schematic block diagram of an embodiment of a service provider server implementing role-based anonymization.

FIG. 3 illustrates a schematic block diagram of an embodiment of a service provider server 110 for receiving, anonymizing and delivering anonymized subscriber data. The service provider server 110 includes a processor 300, memory 310 and network interface 320. The interface 320 is coupled to a network to receive original (raw) subscriber data 125 for a plurality of subscribers of a service provider. The interface may be, for example, a wired interface coupled to a wired network or a wireless interface coupled to a wireless network.

The memory 310 maintains a privacy policy 140 including a role table 330 identifying a base anonymization role 340 for the service provider server 110 and one or more data requester roles 350 for data requesters. Each role 340 and 350 specifies an anonymization function for that role. For example, the base anonymization role 340 specifies a base anonymization function 145 for producing base anonymized data 160 from the received subscriber data 125, whereas each data requester role 350 specifies an associated custom anonymization function 155 for producing custom anonymized data 170 for a particular data requester. The memory 310 further maintains a library of anonymization functions 360. For example, the library of anonymization functions 360 may include the base anonymization function 145 for the service provider server 110 to produce the base anonymized subscriber data 160 from the received subscriber data 125 and one or more custom anonymization functions 155 for customizing the anonymized subscriber data 170 provided to one or more data requesters.

In an example embodiment, upon receiving subscriber data 125 from one or more subscribers of the service provider, the processor 300 is operable to process the received subscriber data 125 using the base anonymization function 145 in the library of anonymization functions 360 specified by the base anonymization role 340 to produce the base anonymized data 160. The processor 300 is further operable to store the base anonymized data 160 within the memory 310.

Upon receiving a request for the subscriber data from a data requester, the processor 300 is further operable to access the privacy policy 140 to determine the data requester role 350 associated with the data requester. The data requester role 350 specifies one or more custom anonymization functions 155 within the library of anonymization functions 360 for use by the processor 300 in responding to the request. For example, the processor can process at least a portion of the base anonymized data 160 using the one or more custom anonymization functions identified in the data requester role 350 for that data requester to produce custom anonymized data 170. The processor 300 can then provide the custom anonymized data 170 to the data requester via the network interface 320.

In various embodiments, the processor 300 further authenticates the data requester prior to creating and/or delivering the custom anonymized data 170 to the data requester. For example, a token-based authentication mechanism can be used to verify the identity of the data requesters and obtain tokens to be used by the data requesters when requesting subscriber data. Upon authentication, the processor 300 can define a role or determine a previously defined role for the data requester within the role table 340 based on the needs of the data requester and assign the data requester to that role 350.

Figure 4:
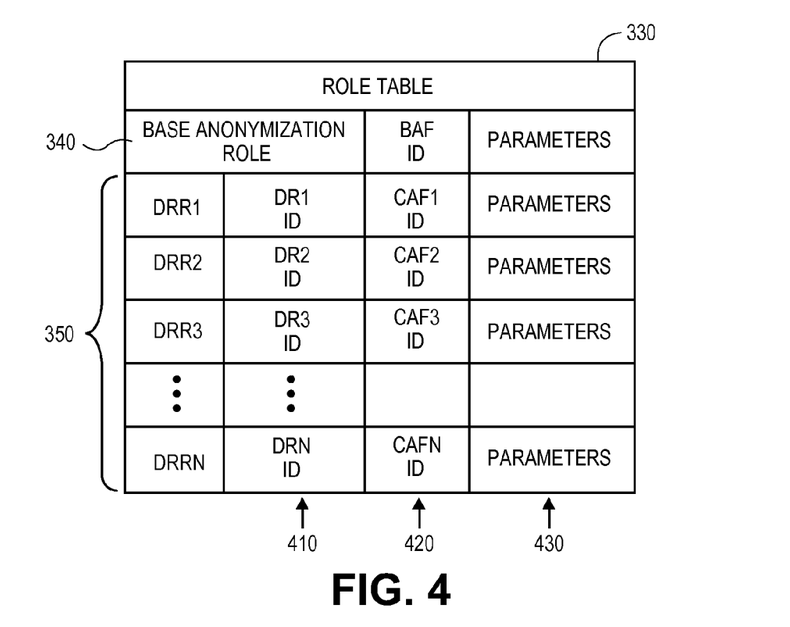
FIG. 4 illustrates an embodiment of a role table maintaining anonymization roles for a plurality of data requesters.

FIG. 4 illustrates an embodiment of a role table 350 maintaining anonymization roles for a plurality of data requesters. The role table 350 includes a plurality of roles 340 and 350 and an anonymization function identifier (ID) 420 identifying one or more anonymization functions to be used for each of the roles 340 and 350. For example, in one embodiment, each anonymization function identifier (ID) 420 specifies a single type and/or level of anonymization for that role 340 or 350. In other embodiments in which a composition of different anonymization functions is desired, the anonymization function ID 420 specifies multiple types and/or levels of anonymization for that role 340 or 350.

In an exemplary embodiment, the role table 350 includes the base anonymization role 340, along with one or more data requester roles (DRR1, DRR2, DRR3 ... DRRN) 350. In other embodiments, the base anonymization role 340 may be stored separately from the data requester roles 350 or multiple tables may be used to store the base anonymization role 340 and data requester roles 350. For the base anonymization role 340, the anonymization function ID 420 specifies the base anonymization function ID (BAF ID), while for the data requester roles 350, the anonymization function ID 420 specifies the custom anonymization function ID (CAF ID1, CAF ID2, CAF ID3 ... CAF IDN).

For each data requester role 350, the role table 330 further includes one or more data requester identifiers (DR1 ID, DR2 ID, DR3 ID ... DRN ID) 410 that identify one or more data requesters assigned to that data requester role 350. In FIG. 4, each data requester role 350 is assigned to only a single data requester. In other embodiments, multiple data requesters (e.g., data requesters that have the same custom anonymization specifications) may be assigned to a single data requester role 350.

Each anonymization role 340 and 350 may further include one or more parameters 430 necessary for anonymizing the subscriber data for that role 340 or 350. For example, if the base anonymization function ID 420 specifies that an encryption anonymization function is to be used to produce the base anonymized data, the encryption key may be included as one of the parameters 430 for the base anonymization role 340. As another example, if one of the data requester roles (e.g., DRR1) specifies that a de-anonymization function that decrypts the base anonymized data is to be used to produce the custom anonymized data, the decryption key may be included as one of the parameters 430 for DRR1.

Figure 5:
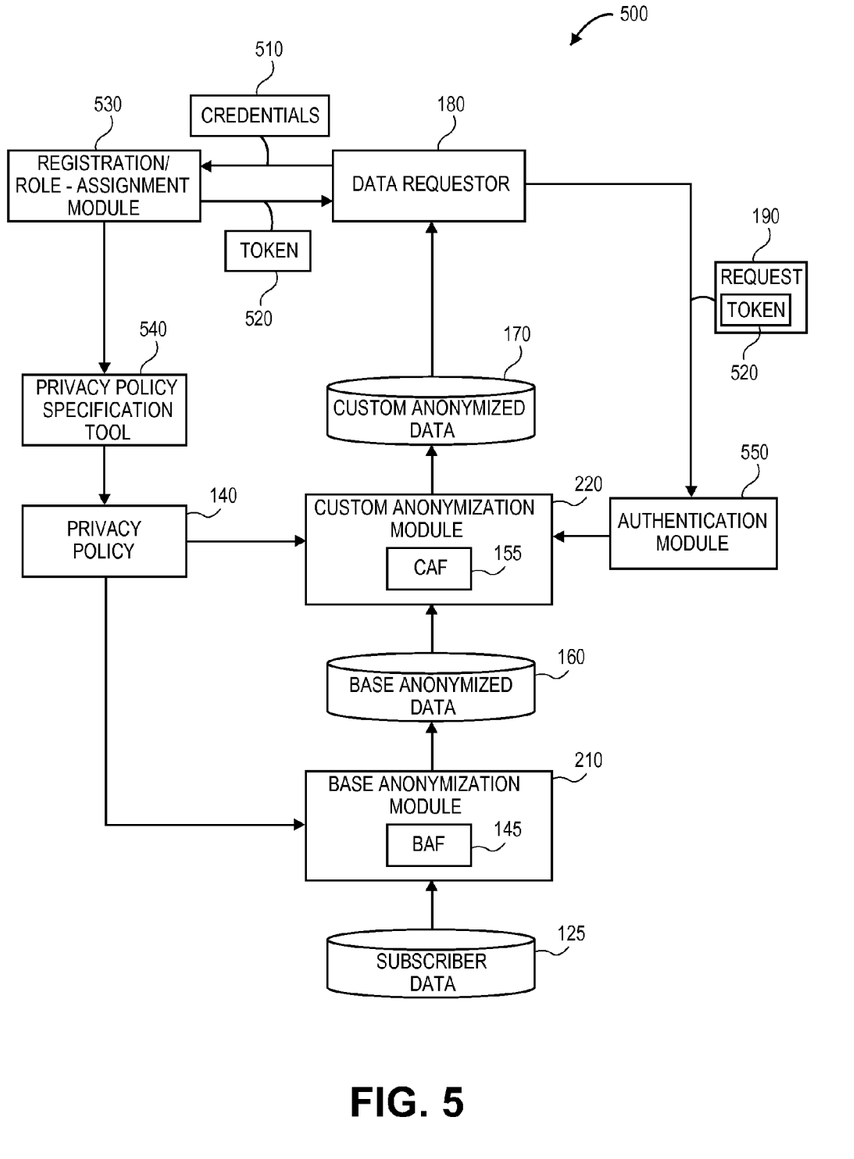
FIG. 5 illustrates a schematic diagram of an embodiment of a token-based role assignment and anonymization system.

FIG. 5 illustrates a schematic diagram of an embodiment of a token-based role assignment and anonymization system 500 that may be at least partially implemented, for example, by the service provider server 110 shown in FIG. 1 or FIG. 3. As shown in FIG. 5, original (raw) subscriber data 125 is input to the base anonymization module 210. The base anonymization module 210 accesses the privacy policy 140 to determine the base anonymization function (BAF) 145 for the system and applies the base anonymization function (BAF) 145 to the original subscriber data 125 to produce base anonymized data 160. The base anonymized data 160 is maintained by the system 200 and updated as new original subscriber data 125 is input to the base anonymization module 210.

In order for a data requester 180 to send a request for the subscriber data, the data requester 180 first registers with the service provider via a registration/role-assignment module 530 of the service provider. For example, the data requester 180 can send credentials 510 to the registration/role-assignment module 530 to enable the registration/role assignment module 530 to verify the identity of the data requester 180 and determine the type and/or level of anonymization that the data requester 180 desires and/or is allowed to receive (based on privacy laws, etc.). Once registered, the registration/role assignment module 530 utilizes a privacy policy specification tool 540 to define or determine a role for the data requester 180 within the privacy policy 140 and assign the data requester 180 to that role.

In addition, the registration/role assignment module 530 provides a token 520 to the data requester 180 to be included by the data requester in a subsequent request 190 for subscriber data. An authentication module 550 receives the request 190 and token 550, and uses the token 550 to authenticate the data requester 180. Upon authentication, the request 190 is input to the custom anonymization module 220, which accesses the privacy policy 140 to determine the role assigned to the data requester 180 and the corresponding custom anonymization function (CAF) 155 to be applied to all or a portion of the base anonymized data 160 for the data requester 180. The custom anonymization module 220 produces custom anonymized data 170 for the data requester 180 using the CAF 155 and delivers the custom anonymized data 170 to the data requester 180.

Figure 6:
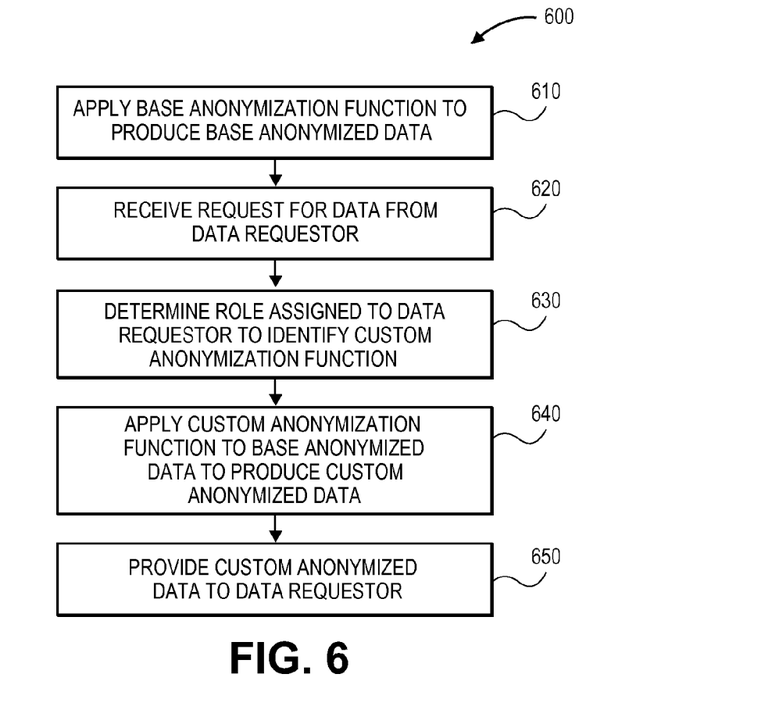
FIG. 6 is a flowchart illustrating an embodiment of a method for providing role-based anonymization.

FIG. 6 is a flowchart illustrating an embodiment of a method 600 for providing role-based anonymization. The method begins at 610, where a base anonymization function is applied to original (raw) subscriber data to produce base anonymized data. At 620, a request for subscriber data is received from a data requester. At 630, the role assigned to the data requester is determined to identify a custom anonymization function for that data requester. At 640, the custom anonymization function is applied to the base anonymized data to produce custom anonymized data, and at 650, the custom anonymized data is provided to the data requester.

As may be used herein, the term "processor" is defined as either a single processing device or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on hard coding of the circuitry and/or operational instructions. The processor may further access an external memory device and/or include an integrated memory device, which may be a single memory device, a plurality of memory devices, and/or embedded circuitry of another processor. Such an integrated memory device and/or an external memory device may be a read-only memory, random access memory, volatile memory, non-volatile memory, static memory, dynamic memory, flash memory, cache memory, and/or any device that stores digital information. Note that the memory device may store, and the processor may execute, hard coded and/or operational instructions corresponding to at least some of the steps and/or functions described herein. Such a memory device can further be included in an article of manufacture.

As may also be used herein, the term(s) "coupled to" and/or "coupling" includes direct coupling between items and/or indirect coupling between items via an intervening item (e.g., an item includes, but is not limited to, a component, an element, a circuit, a module and/or a device) where, for indirect coupling, the intervening item does not modify the information of a signal. As may further be used herein, inferred coupling (i.e., where one element is coupled to another element by inference) includes direct and indirect coupling between two items in the same manner as "coupled to". As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to".

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An apparatus, comprising:
an interface configured to receive subscriber data related to at least one subscriber of a service provider, the interface further configured to receive a request for the subscriber data from a data requester and for providing custom anonymized subscriber data to the data requester;
a processor configured to:
maintain a role table including a plurality of roles and one or more of a plurality of custom anonymization functions associated with each of the plurality of roles;
apply a base anonymization function to the subscriber data to produce base anonymized subscriber data that cannot be associated with any particular subscriber that complies with the applicable privacy laws;
determine, in response to said request, one of the plurality of roles in the role table assigned to the data requester;
determine at least one of the plurality of custom anonymization functions associated with the one of the plurality of roles assigned to the data requester using the role; and
apply, in response to said request, the associated custom anonymization function to the base anonymized subscriber data to produce custom anonymized subscriber data, wherein the associated custom anonymization function includes a different type of anonymization than does the base anonymization function; and
a memory for storing the base anonymized subscriber data and a privacy policy specifying the base anonymization function and the role table.

2. The apparatus of claim 1, wherein:
the base anonymization function provides a base level of anonymization of the subscriber data to produce the base anonymized subscriber data that cannot be associated with any particular subscriber; and
the associated custom anonymization function provides an additional level of anonymization to the base anonymized subscriber data over the base level.

3. The apparatus of claim 1, wherein the associated custom anonymization function is a de-anonymization function that de-anonymizes the base anonymized subscriber data to produce de-anonymized subscriber data as the custom anonymized subscriber data.

4. The apparatus of claim 3, wherein the de-anonymized subscriber data is the subscriber data.

5. The apparatus of claim 1, wherein the associated custom anonymization function is a composite anonymization function including two or more types of data anonymization.

6. The apparatus of claim 1, wherein the associated custom anonymization function includes two or more of: an encryption function, a decryption function, a k-anonymity function or a data masking function.

7. The apparatus of claim 1, wherein the one of the plurality of roles assigned to the data requester includes a type of anonymity and one or more parameters for the type of anonymity for the associated custom anonymization function.

8. The apparatus of claim 1, wherein the processor is configured to authenticate the data requester prior to providing the custom anonymized subscriber data to the data requester.

9. The apparatus of claim 8, wherein the processor is configured to use a token provided by the data requester with the request for the subscriber data to authenticate the data requester.

10. A non-transitory memory device having accessible therefrom a set of instructions interpretable by at least one processor, the set of instructions configured for causing the processor to carry out operations for:
   applying a base anonymization function to subscriber data to produce base anonymized subscriber data that cannot be associated with any particular subscriber;
   updating the base anonymized subscriber data by applying the base anonymization function to newly inputted subscriber data;
   receiving a request from a data requester;
   accessing a role table that includes a plurality of roles and one or more of a plurality of custom anonymization functions associated with each of the plurality of roles;
   determining one of the plurality of roles assigned to the data requester and an associated custom anonymization function to be applied to the base anonymized subscriber data using the role table;
   applying the associated custom anonymization function to the base anonymized subscriber data to produce custom anonymized subscriber data, wherein the associated custom anonymization function includes a different type of anonymization than does the base anonymization function; and
   providing the custom anonymized subscriber data to the data requester.

11. The memory of claim 10, wherein:
   the base anonymization function provides a base level of anonymization of the subscriber data to produce the base anonymized subscriber data that cannot be associated with any particular subscriber; and
   the associated custom anonymization function provides an additional level of anonymization of the subscriber data over the base level.

12. The memory of claim 10, wherein the associated custom anonymization function is a de-anonymization function that de-anonymizes the base anonymized subscriber data to produce de-anonymized subscriber data as the custom anonymized subscriber data.

13. The memory of claim 10, wherein the associated custom anonymization function specifies that the base anonymized subscriber data is the custom anonymized subscriber data.

14. The memory of claim 10, wherein at least one of the base anonymization function and the associated custom anonymization function is a composite anonymization function including two or more types of data anonymization.

15. The memory of claim 10, wherein the associated custom anonymization function includes two or more of: an encryption function, a decryption function, a k-anonymity function or a data masking function.

16. The memory of claim 10, wherein the set of instructions further causes the processor to carry out operations for:
   authenticating the data requester prior to providing the custom anonymized subscriber data to the data requester.

17. A method for providing role-based anonymization, the method comprising:
   applying a base anonymization function to subscriber data related to at least one subscriber of a service provider to produce base anonymized subscriber data, wherein the base anonymization function processes the subscriber data to produce the base anonymized subscriber data that cannot be associated with any particular subscriber;
   receiving a request for the subscriber data from a data requester;
   determining a role assigned to the data requester requesting the subscriber data, the role specifying a custom anonymization function to be applied to the base anonymized subscriber data, wherein the custom anonymization function is a composite anonymization function including two or more types of data anonymization;
   applying the custom anonymization function to the base anonymized subscriber data to produce custom anonymized subscriber data; and
   providing the custom anonymized subscriber data to the data requester.

18. The method of claim 17, wherein the composite anonymization function including the two or more types of data anonymization includes two or more of: an encryption function, a decryption function, a k-anonymity function or a data masking function.

19. The method of claim 18, wherein the base anonymization function includes two or more of: an encryption function, a decryption function, a k-anonymity function or a data masking function.

20. The method of claim 19, wherein the custom anonymization function includes a different type of anonymization than does the base anonymization function.

* * * * *